(12) United States Patent
Zhang et al.

(10) Patent No.: US 12,110,946 B2
(45) Date of Patent: Oct. 8, 2024

(54) ULTRASONIC MOTOR-BASED REGULATED MAGNETORHEOLOGICAL VIBRATION ISOLATOR

(71) Applicant: BEIJING INSTITUTE OF CONTROL ENGINEERING, Beijing (CN)

(72) Inventors: Jiyang Zhang, Beijing (CN); Ruizhi Luo, Beijing (CN); Qiang Zhang, Beijing (CN); Tao Qing, Bejing (CN); Gang Zhou, Beijing (CN); Jintao Wu, Beijing (CN); Limei Tian, Beijing (CN); Yahong Fan, Beijing (CN); Shuyan Wang, Beijing (CN); Hong Wang, Beijing (CN)

(73) Assignee: BEIJING INSTITUTE OF CONTROL ENGINEERING, Beijing (CN)

( * ) Notice: Subject to any disclaimer, the term of this patent is extended or adjusted under 35 U.S.C. 154(b) by 332 days.

(21) Appl. No.: 17/776,967

(22) PCT Filed: Feb. 27, 2020

(86) PCT No.: PCT/CN2020/076996
§ 371 (c)(1),
(2) Date: May 13, 2022

(87) PCT Pub. No.: WO2021/093221
PCT Pub. Date: May 20, 2021

(65) Prior Publication Data
US 2022/0412431 A1    Dec. 29, 2022

(30) Foreign Application Priority Data
Nov. 15, 2019 (CN) .......................... 201911121220.9

(51) Int. Cl.
*F16F 9/53* (2006.01)
*F16F 9/32* (2006.01)

(52) U.S. Cl.
CPC ............ *F16F 9/535* (2013.01); *F16F 9/3271* (2013.01); *F16F 9/3292* (2013.01);
(Continued)

(58) Field of Classification Search
CPC .......................... F16F 9/3292; F16F 2224/045
See application file for complete search history.

(56) References Cited

FOREIGN PATENT DOCUMENTS

CN         202484184 U     10/2012
CN         104791411 A  *  7/2015
(Continued)

OTHER PUBLICATIONS

International Search Report (English and Chinese) and Written Opinion of the International Searching Authority (Chinese) issued in PCT/CN2020/076996, mailed Aug. 3, 2020; ISA/CN.

*Primary Examiner* — Melody M Burch
(74) *Attorney, Agent, or Firm* — Harness, Dickey & Pierce, P.L.C.

(57) ABSTRACT

An ultrasonic motor-based regulated variable-damping vibration isolator, includes a base, a magnetorheological damper, and an adapter plate. The magnetorheological damper is mainly used to support and deplete the energy of vibration; the magnetorheological damper includes an upper cavity, a lower cavity, a connecting ring, a permanent magnet, orifices, a magnetic permeable ring, an ultrasonic motor and the like; a magnetorheological fluid is stored in the upper and lower cavities defined by bellows. The magnetorheological damper uses the ultrasonic motor to drive the permanent magnet to rotate to adjust the overlap ratio of the permanent magnet and the orifices, that is, to adjust the number of the orifices entering the magnetic field of the (Continued)

permanent magnet, so as to change the damping intensity of the damper. After rotating in place, the ultrasonic motor can be powered off and self-locked.

8 Claims, 3 Drawing Sheets

(52) U.S. Cl.
CPC ..... *F16F 2222/06* (2013.01); *F16F 2224/045* (2013.01); *F16F 2226/048* (2013.01); *F16F 2230/0005* (2013.01); *F16F 2230/0047* (2013.01)

(56) References Cited

FOREIGN PATENT DOCUMENTS

| | | | |
|---|---|---|---|
| CN | 105003585 A | | 10/2015 |
| CN | 107218337 A | | 9/2017 |
| CN | 107559371 A | * | 1/2018 |
| CN | 108974382 A | | 12/2018 |
| CN | 10759371 B | * | 9/2020 |
| DE | 102008058358 A1 | | 5/2010 |
| KR | 101907583 B1 | * | 10/2018 |

\* cited by examiner (a)

(b)

(c)

ULTRASONIC MOTOR-BASED REGULATED MAGNETORHEOLOGICAL VIBRATION ISOLATOR

The present application is the national phase of International Application No. PCT/CN2020/076996, titled "ULTRASONIC_MOTOR-BASED REGULATED MAGNETORHEOLOGICAL VIBRATION ISOLATOR", filed on Feb. 27, 2020, which claims the priority to Chinese Patent Application No. 201911121220.9, titled "VARIABLE DAMPING VIBRATION ISOLATOR REGULATED BY ULTRASONIC MOTOR", filed with the China National Intellectual Property Administration on Nov. 15, 2019, the entire disclosures of which are incorporated herein by reference.

FIELD

The present application relates to the field of vibration control technology, and in particular to a magnetorheological vibration isolator regulated by an ultrasonic motor.

BACKGROUND

Inertial attitude actuators such as control moment gyroscopes have been widely used in high-precision spacecraft such as remote sensing satellites and space laboratories, and are the key products for the spacecraft to achieve fast attitude maneuver and attitude stability. With the rapid development of aerospace technology, the requirements of users on satellite performance (for example the resolution of cameras) become higher and higher, and payloads that realize the satellite performance have higher and higher requirements on the attitude accuracy and stability of a spacecraft platform. However, in the process of high-speed rotation, rotors of the inertial attitude actuators will generate broadband and micro-amplitude vibration, which becomes one of main vibration sources of the spacecraft, and affects the attitude accuracy and stability of the spacecraft and the ultra-quiet performance of the platform, thereby affecting realization of performance indicators of the payloads to a certain extent. Therefore, a stable working platform is a prerequisite for the normal operation of the payloads such as high-performance sensors.

Micro-vibration control is an effective way to improve the stability of the platform.

However, the vibration reduction directed to the structure of the inertial attitude actuators such as control moment gyroscopes is difficult to achieve a good micro-vibration suppression effect, and the isolation of micro-vibration in a vibration transmission path is relatively simple and effective. Spring-rubber dampers or metal spring-metal rubber dampers are generally used for vibration isolation. However, rubber is greatly affected by temperature and frequency and is not resistant to space irradiation and atomic oxygen corrosion, while metal rubber has strong nonlinearity and has different damping coefficients and stiffness at large amplitude and small amplitude, which is inconvenient to design. In addition, once their structures are determined, the damping coefficient substantially cannot be changed, which is difficult to meet the requirements in different environments and operating conditions. Traditional magnetorheological and electrorheological liquid dampers can actively adjust the damping as required, but they need a long-term power supply, which increases the cost of being used on-orbit. Therefore, variable-damping isolators in which damping designing and stiffness designing are decoupled, the damping is adjustable, the power consumption is low, and are adaptive to different environments of the ground and on-orbit, and resistant to irradiation and atomic oxygen corrosion are required to be researched and developed.

The traditional fluid dampers mainly use a single rod or double rods to push a piston to move, to squeeze the fluid to flow, so as to generate a certain amount of liquid damping. In view of the inevitable gap between the rod and a sealing cavity, there is inevitable micro-leakage of liquid, which not only reduces the liquid damping performance, but also may pollute the environment on the satellite, making it difficult for the traditional fluid dampers to meet the requirements of long-life operation.

Energy consumption in the traditional manner of using the magnetorheological fluid for damping mainly lies in using an electrified coil to generate a magnetic field, the magnitude of the magnetic field is adjusted by the magnitude of current, which changes the kinematic viscosity of magnetorheological fluid in the orifices and thereby adjusting the damping. When the current in the coil disappears, the magnetic field also disappears and the magnetic field required by the magnetorheological fluid cannot be maintained. That is, the coil is required to be electrified all the time, which causes a large amount of electric energy being consumed.

SUMMARY

The technical problem to be solved by the present application is to overcome the deficiencies of the conventional art, to provide a magnetorheological vibration isolator regulated by an ultrasonic motor, which is better adaptive to space environment, can realize variable damping of the vibration isolator at the reduced costs such as weight and power consumption, and suppress broadband vibration generated or endured by inertial actuators such as control moment gyroscopes in different environments and operating conditions.

The technical solution according to the present application is as follows. A magnetorheological vibration isolator regulated by an ultrasonic motor includes a base; a plurality of magnetorheological dampers; and a plurality of adapter plates; each of the plurality of adapter plates is connected to the base through the plurality of magnetorheological dampers and configured to be connected to a vibration-to-be-isolated device;

each of the plurality of magnetorheological dampers includes a lower cover plate, a lower cavity, a connecting ring, a permanent magnet, orifices, an upper cavity, an upper cover plate, an upper thrust rod, an upper gland, a paramagnet, a lower gland, a magnetic conducting ring, a fixing ring, a housing, an ultrasonic motor, and a lower thrust rod; and one end of the upper thrust rod is connected to the connecting ring, to serve as an output end or an input end for vibration isolation, and the upper thrust rod is connected to the adapter plate; the lower thrust rod is installed at a middle portion of the lower cover plate, to serve as the input end or the output end for the vibration isolation, and the lower thrust rod is connected to the base; the lower cover plate and the upper cover plate are connected via the housing; the connecting ring is welded with corrugated pipes to form the lower cavity and the upper cavity, and the lower cavity and the upper cavity are filled with a magnetorheological fluid; the connecting ring is equally divided in a circumferential direction into 2n areas each having a central angle of $\pi/n$, where n is a natural number, a plurality of orifices are distributed in one area of each two adjacent areas of the 2n areas, and there is no orifices in the other area of the two adjacent areas; the magnetic conducting ring is installed at an outer side of the connecting ring, the permanent magnet and the paramagnet are installed at an inner side of the connecting ring in an alternative manner, and the permanent magnet and the paramagnet are installed on a output shaft of the ultrasonic motor via the upper gland and the lower gland; one corrugated pipe, which defines the lower cavity, of the corrugated pipes, is located at an outer side of the ultrasonic motor, an end of the lower cavity and an end of the upper cavity are pressed by the lower cover plate and the upper cover plate respectively, to realize parallel connection of the corrugated pipes corresponding to the lower cavity and the upper cavity; and when the input end and the output end for vibration isolation move relative to each other under an effect of a load, the connecting ring moves up and down relative to the housing, and the magnetorheological fluid in the lower cavity and the upper cavity is squeezed from one of the lower cavity and the upper cavity into the other through the orifices.

Magnetic lines of force of the permanent magnet form a loop by passing through the connecting ring and the magnetic conducting ring, the ultrasonic motor drives the permanent magnet and the paramagnet to rotate; when the permanent magnet and the orifices overlap in the circumferential direction, a magnetic field between the permanent magnet and the magnetic conducting ring passes through the orifices, to make the magnetic field be strengthened at the orifices in an overlapping area, and a kinematic viscosity of the magnetorheological fluid in the orifices in the overlapping area is increased; and a magnitude of damping of the magnetorheological vibration isolator is adjusted by adjusting the number of the orifices in the magnetic field.

The ultrasonic motor operates in a continuous mode or a stepping mode, and an angular displacement sensor is used for feedback; when the ultrasonic motor operates in the stepping mode, a zero position sensor is used to calibrate an angular position of a rotor of the ultrasonic motor, a rotation angle of the permanent magnet is calculated by counting the number of steps of the ultrasonic motor, and a degree of overlap between the permanent magnet and the orifices in the circumferential direction is obtained, to obtain a damping coefficient of the damping vibration isolator.

After driving the permanent magnet to a set angle, the ultrasonic motor can be powered off and self-locked, and the damping vibration isolator operates in a passive vibration isolation state with little consumption of electric energy.

The number of the magnetorheological dampers and an inclination angle of each of the magnetorheological dampers are determined based on characteristics of a vibration-to-be-isolated object and vibration isolation requirements.

Each of the permanent magnet and the paramagnet is of a fan-shaped structure with a U-shaped cross section.

Each of the permanent magnet and the paramagnet has a central angle of $\pi/n$ in each of the areas.

The advantages of the present application over the conventional art are as follows.

1. The present application uses a cavity of corrugated pipes to store the magnetorheological fluid, and uses a middle section and two ends of the cavity as the input and output ends of the vibration. Under the effects of vibration, the input end and the output end move relative to each other, so that the middle section moves relative to the two ends, and the liquid is squeezed to flow in the upper and lower cavities, thus the dampers realize simulation of piston motion in a condition without dynamic and static gaps, which provides fluid damping, and avoids liquid leakage caused by the dynamic and static gaps of traditional dampers, and thus is suitable for long-life applications in space.

2. In the gravitational field such as the ground and the like, the magnetic particles suspended in the magnetorheological fluid are easily precipitated, and special surface modification treatment is required for the magnetic particles. In the present application, the magnetorheological fluid is applied to space products, and thus is in a weightless state, so that that the suspended magnetic particles are not easily precipitated, which can better maintain the uniformity of the magnetorheological fluid, and can better exert the active damping adjustment performance of the magnetorheological fluid.

3. The damper according to the present application uses the ultrasonic motor to drive the permanent magnet to rotate, to adjust the number of orifices enter in the magnetic field, so as to realize the approximate linear regulation of the damping of the magnetorheological damper. Since the magnetic field involved in the present application originates from the permanent magnet, it is unnecessary to use current to generate the magnetic field. The ultrasonic motor only drives the permanent magnet to rotate to change the distribution of the orifices relative to the magnetic field, and after driving the permanent magnet to a certain angle, the ultrasonic motor can be powered off and self-locked, and electric energy will be barely consumed. In this case, the damper operates in a passive vibration isolation state. Energy consumption is effectively reduced and the valuable energy is saved for the spacecraft.

4. The damper according to the present application uses the ultrasonic motor to drive the permanent magnet to rotate. Approximate linear regulation of the damping of the damper can be adjusted by adjusting a degree of overlap between the permanent magnet and the orifices, because the degree of overlap is a linear function of the angle. The ultrasonic motor uses the vibration of traveling waves to crawl, which not depend on the rotating magnetic field. Therefore, the ultrasonic motor is not affected by the magnetic field of the permanent magnet, while an electromagnetic motor is easily affected by the permanent magnet. In addition, the ultrasonic motor can operate in the stepping mode, when the requirements for damping control are not high, the angular displacement sensor may not be required, and only a zero position sensor may be used for simple control, which simplifies the structure of the damper.

5. The vibration isolator according to the present application can dissipate the vibration energy transmitted from the satellite platform to the products such as control moment gyroscopes in a launch section, to protect the products, and it can also reduce the impact of the micro-vibration generated in the operating process of the products on the satellite platform in an on-orbit section. For example, in the processes such as maneuver of the control moment gyroscope, the ultrasonic motor can be used to drive the permanent magnet, to increase the damping force of the magnetorheological fluid, improve the dissipation of vibration energy, and improve the stability of the system. When the vibration is small, for example, in the process that the control moment gyroscope is locked or maneuvers slowly, the permanent magnet may be adjusted to reduce the damping force, to improve the attenuation rate of the vibration isolator to high-frequency vibration. Therefore, the vibration isolator can actively adjust the damping according to different application conditions and vibration conditions, which has good vibration isolation performance.

6. According to the magnetorheological damper of the present application, the magnetorheological fluid is stored in the cavity of the corrugated pipes, and the middle section and the two ends of the cavity serve as the input and output ends of the vibration, to realize the simulated piston motion of the damper without dynamic and static gaps, the fluid is pushed to flow, so as to provide fluid damping. The application integrates fluid damping, magnetic damping and magnetorheological damping, and realizes adjustment of the magnitude of magnetorheological damping by using the ultrasonic motor to drive the permanent magnet to rotate.

DETAILED DESCRIPTION OF THE EMBODIMENTS

The vibration isolation effect of a vibration isolator is closely related to the damping of the vibration isolator. The vibration isolation with small damping can effectively isolate high-frequency vibration, while the vibration isolation with large damping can quickly dissipate the vibration energy with large amplitude such as resonance. Therefore, the vibration transmitted from a satellite platform to actuators such as control moment gyroscopes in a launch section can be effectively suppressed, to protect products. In addition, the vibration with large amplitude generated by the actuators such as control moment gyroscopes in an on-orbit section during a maneuvering process can also be suppressed. Therefore, the present application proposes a variable-damping vibration isolation manner, in which an ultrasonic motor is used to drive a permanent magnet to rotate, in order to adjust a degree of overlap between a magnetic field and orifices, to substantially increase a viscosity of a magnetorheological fluid entering the orifices in the magnetic field, thereby realizing the variable-damping vibration isolation of the vibration isolator, that is, a magnetorheological vibration isolator regulated by an ultrasonic motor is provided according to the present application.

Figure 1:
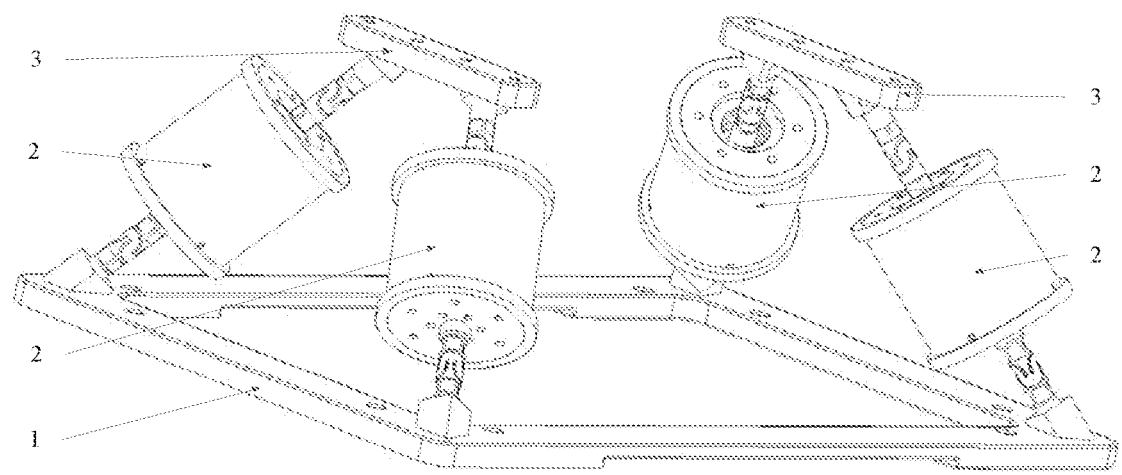
FIG. 1 is a schematic view showing the structure of a variable-damping vibration isolator according to the present application.
Figure 2:
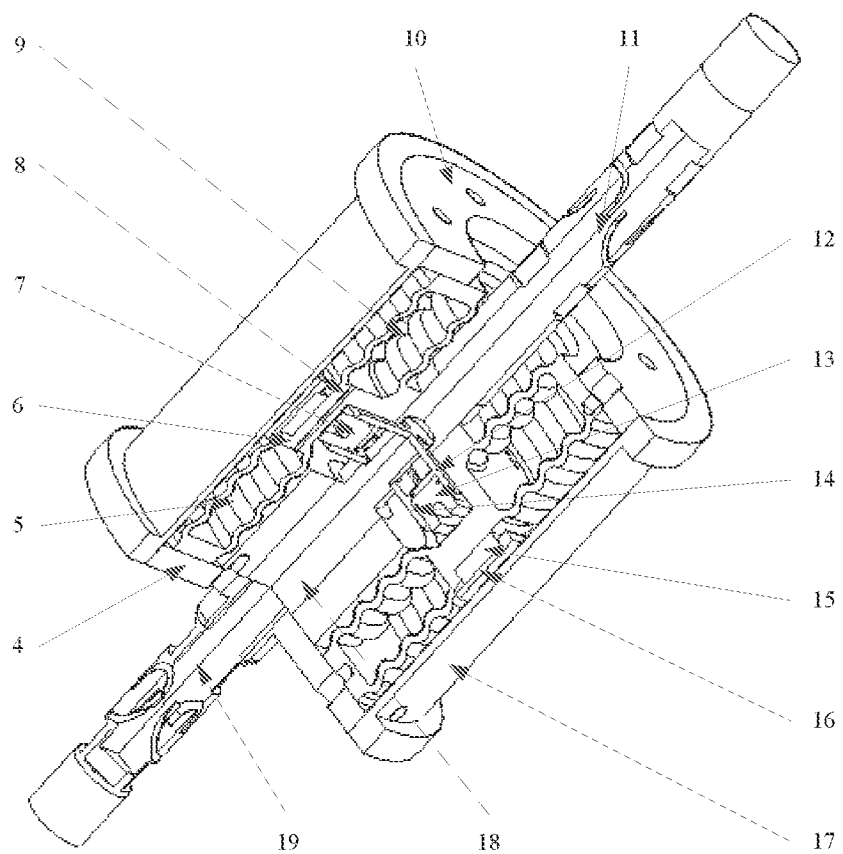
FIG. 2 is a longitudinal sectional view showing the structure of the variable damper structure according to the present application.
Figure 3:
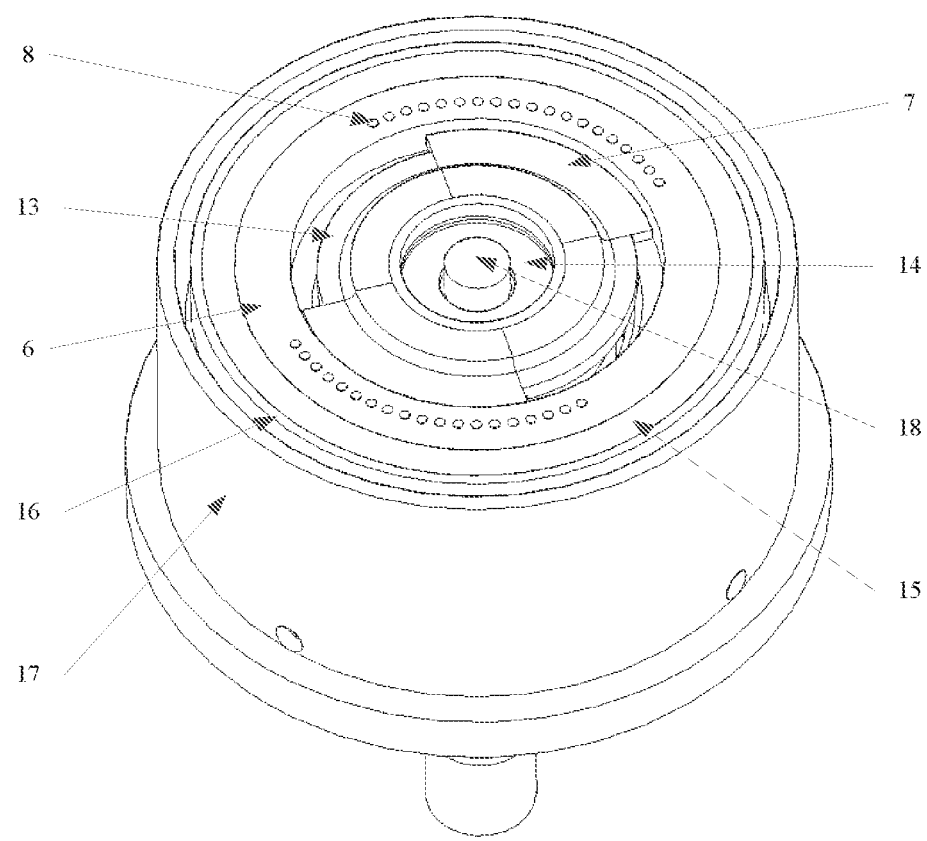
FIG. 3 is a cross sectional view showing the structure of the variable damper structure according to the present application.
Figure 4:
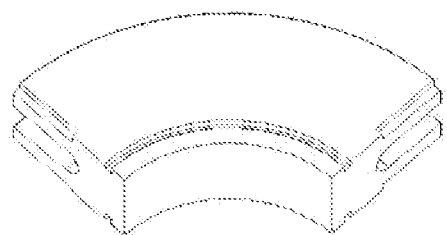
FIG. 4(a) is a schematic view showing the structure of a permanent magnet and a paramagnet according to the present application.
FIG. 4(b) is a schematic view showing the structure of an upper gland according to the present application.
FIG. 4(c) is a schematic view showing the structure of a lower gland according to the present application.
Figure 4:
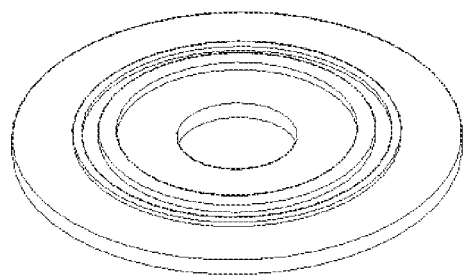
Figure 4:
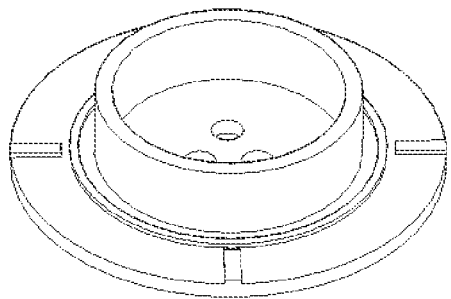

As shown in FIG. 1, the magnetorheological vibration isolator regulated by the ultrasonic motor according to the present application includes a base 1, magnetorheological dampers 2, and an adapter plate 3. The structure of the base 1 is determined based on the installation manner of a spacecraft deck, et al, and the structure of the adapter plate 3 is determined based on a connecting port of a vibration-to-be-isolated object such as a control moment gyroscope. The base 1 is connected via screws of lower thrust rods 19 of the magnetorheological dampers 2, and the adapter plate 3 is connected via screws of upper thrust rods 11 of the magnetorheological dampers 2. Parameters such as the number and inclinations of the magnetorheological dampers 2 are optimized and determined based on specific conditions such as the characteristics of the vibration-to-be-isolated object and the vibration isolation requirements.

As shown in FIGS. 2, 3 and 4a-4c, each of the magnetorheological dampers 2 includes a lower cover plate 4, a lower cavity 5, a connecting ring 6, a permanent magnet 7, orifices 8, an upper cavity 9, an upper cover plate 10, an upper thrust rod 11, an upper gland 12, a paramagnet 13, a lower gland 14, a magnetic conducting ring 15, a fixing ring 16, a housing 17, an ultrasonic motor 18, and a lower thrust rod 19. The connecting ring 6 is connected with two corrugated pipes corresponding to the lower cavity 5 and the upper cavity 9 by electron beam welding, to form the lower cavity 5 and the upper cavity 9 respectively, which are filled with magnetorheological fluid.

$2n$ areas each having a central angle of $\pi/n$ are evenly distributed in a circumferential direction of the connecting ring 6, where n is a natural number, in this embodiment, $n=2$. A plurality of orifices 8 are distributed in one area of each two adjacent areas of the $2n$ areas; and there are no orifices in n areas each having a central angle of $\pi/n$ between the areas in which the orifices are distributed. The magnetic conducting ring 15 is installed at an outer side of the connecting ring 6, the permanent magnets 7 and the paramagnets 13 are installed at an inner side of the connecting ring 6 in an alternative manner, and a central angle of each of the permanent magnets 7 and a central angle of each of the paramagnets 13 are $\pi/n$ in each area. The permanent magnets 7 and the paramagnets 13 are installed on an output shaft of the ultrasonic motor 18 via the upper gland 12 and the lower gland 14.

Magnetic lines of force of the U-shaped permanent magnet 7 may form a loop by passing through the connecting ring 6 and the magnetic conducting ring 15. When the magnetorheological fluid is not in the magnetic field, the kinematic viscosity of the magnetorheological fluid is only that of a general fluid, and the damping of the damper is embodied as general fluid damping and magnetic damping; when the magnetorheological fluid is in the magnetic field, it will be affected by the magnetic field, and the kinematic viscosity of the magnetorheological fluid will be substantially increased, and the damping is embodied as magnetorheological damping and magnetic damping, where the magnetorheological fluid damping is much greater than the magnetic damping. In the present application, the ultrasonic motor 18 is employed to drive the permanent magnets 7 and the paramagnets 13 to rotate. When each of the permanent magnets 7 overlap with the corresponding orifices 8 in the circumferential direction, the magnetic lines of force between the permanent magnet 7 and the magnetic conducting ring 15 pass through the orifices 8, so that the magnetic field is greatly strengthened at the orifices 8 in the overlapping area and the kinematic viscosity of the magnetorheological fluid in the orifices 8 in the overlapping area is greatly increased. The magnitude of damping can be adjusted by adjusting a size of the overlapping area, i.e., adjusting the number of orifices 8 in the magnetic field. When the permanent magnet 7 and the orifices 8 completely overlap in the circumferential direction, the number of the orifices 8 located in the magnetic field is maximum, in this case, the damping is the largest; when the permanent magnet 7 and the orifices 8 do not overlap in the circumferential direction, the number of the orifices 8 in the magnetic field is minimum, in this case, the damping is the smallest. Since the ultrasonic motor 18 can rotate by any angle, and a degree of overlap is a linear function of a rotation angle, the magnetorheological fluid damper in which the ultrasonic motor is used to drive the permanent magnet to rotate to adjust the degree of overlap between the permanent magnet and the orifices has an function of approximate linear damping adjustment.

The ultrasonic motor 18 may operate in a continuous mode or a stepping mode, and an angular displacement sensor may be used to measure a rotation angle of a rotor of the ultrasonic motor 18 and perform angular displacement feedback. When the requirements for damping control are not high, the ultrasonic motor 18 may operate in the stepping mode, and only a zero position sensor is used to calibrate an angular position of the rotor of the ultrasonic motor 18. A rotation angle of the permanent magnet 7 may be estimated by counting the number of steps of the ultrasonic motor 18, and the degree of overlap between the permanent magnet 7 and the orifices 8 in the circumferential direction is estimated, to obtain a damping coefficient of the damper. Therefore, an open-loop control may be carried out according to a command; alternatively, a closed-loop control may be carried out based on the magnitude of vibration, which simplifies the structure of the vibration isolator.

The lower cover plate 4 and the upper cover plate 10 are connected with each other through the housing 17, to form a whole piece, and an end of the lower cavity 5 and an end of the upper cavity 9 are pressed by the lower cover plate 4 and the upper cover plate 10 respectively, to realize parallel connection between the corrugated pipes corresponding to the lower cavity 5 and the upper cavity 9. The lower cover plate 4 and the lower thrust rod 19 are connected via threads, threads at an outer end of the lower thrust rod 19 serves as a port for external installation, to serve as an input end or an output end for vibration isolation. The connecting ring 6 at the middle section is connected with the upper thrust rod 11 through threads, and threads at an outer end of the upper thrust rod 11 serves as a port for external installation, to serve as the output end or the input end for vibration isolation. When there is a relative movement between the input end and the output end under the effects of loads such as the vibration, the connecting ring 6 moves up and down relative to the housing 17, etc., and the magnetorheological fluid is pushed to flow between the lower cavity 5 and the upper cavity 9, and friction inside the magneticrheological fluid and friction between the magneticrheological fluid and the orifices 8 generate a damping force. This structure realizes simulated piston motion of the damper in a condition without dynamic and static gaps, which can better ensure that there's no leakage during long time on-orbit operation.

The magnetorheological damper 2 uses the ultrasonic motor 18 to drive the permanent magnet 7 to change the distribution of the magnetic field relative to the orifices 8, and adjusts the degree of overlap between the permanent magnet 7 and the orifices 8, i.e., to change the magnitude of the damping of the damper by adjusting the number of the orifices 8 entering the magnetic field of the permanent magnet 7. The magnetic field originates from the permanent magnet 7, and electric current is not required to generate the magnetic field. The ultrasonic motor 18 is only used to drive the permanent magnet 7 to rotate, to change the distribution of the magnetic field, and after rotating the permanent magnet 7 to a specified angle, the ultrasonic motor 18 is powered off and self-locked, and almost no more power is consumed. In this case, the damper operates in a passive vibration isolation state. Power consumption is effectively reduced and energy for the spacecraft is saved.

The suspended magnetic particles in the magnetorheological fluid are not easily precipitated in a weightless state, which can better maintain the uniformity of the magnetorheological fluid, and the damping adjustment performance of the magnetorheological fluid damper can be better performed.

When the vibration is relatively large, especially in the processes such as maneuver of the control moment gyroscope, the permanent magnet 7 may be driven by the ultrasonic motor 18, to increase the degree of overlap between the permanent magnet 7 and the orifices 8 in the circumferential direction, which increases the damping force of the magnetorheological fluid, improves the dissipation of vibration energy, and thereby enhancing the stability of the system; when the vibration is relatively small, for example, in the process that the control moment gyroscope is locked or maneuvers slowly, the permanent magnet 7 can be adjusted to reduce the degree of overlap between the permanent magnet 7 and the orifices 8 in the circumferential direction, which reduces the damping force of the magnetorheological fluid, reduces the damping ratio, and thereby improving the attenuation rate of the vibration isolator on high-frequency vibration. When driving the permanent magnet 7 to a certain angle, the ultrasonic motor 18 can be powered off, in this case, the damper operates in the passive vibration isolation state. It can be seen that throughout the whole process, except that the ultrasonic motor 18 needs to consume electric energy to drive the permanent magnet 7, when the permanent magnet 7 does not need to rotate, the ultrasonic motor 18 is powered off and self-locked almost without power consumption. Therefore, the power consumption of the damper is small, which effectively reduces energy consumption. Not only the function of actively adjustable damping is realized, but also the precious electric energy consumed by the damper is effectively reduced. Each of the permanent magnet 7 and the paramagnet 13 is of a fan-shaped structure with a U-shaped cross section.

The ultrasonic motor 18 uses the vibration of traveling waves to crawl, which is not depend on the rotating magnetic field, and therefore is not affected by the magnetic field, which overcomes the problem that the electromagnetic motor is easily affected by the permanent magnet. In addition, the ultrasonic motor 18 has no magnetic elements and no coils, hence it will not generate a magnetic field having large magnitude and will not affect the damping performance of the magnetorheological damper 2.

The contents not described in detail in the present application belong to the well-known technology to those skilled in the art.

The invention claimed is:

1. A magnetorheological vibration isolator regulated by an ultrasonic motor, comprising:
   a base;
   a plurality of magnetorheological dampers; and
   a plurality of adapter plates; wherein
   each of the plurality of adapter plates is connected to the base through the plurality of magnetorheological dampers and configured to be connected to a vibration-to-be-isolated device, and
   each of the plurality of magnetorheological dampers comprises a lower cover plate, a lower cavity, a connecting ring, a permanent magnet, orifices, an upper cavity, an upper cover plate, an upper thrust rod, an upper gland, a paramagnet, a lower gland, a magnetic conducting ring, a fixing ring, a housing, an ultrasonic motor, and a lower thrust rod; and wherein one end of the upper thrust rod is connected to the connecting ring, to serve as an output end or an input end for vibration isolation, and the upper thrust rod is connected to the adapter plate; the lower thrust rod is installed at a middle portion of the lower cover plate, to serve as the input end or the output end for vibration isolation, and the lower thrust rod is connected to the base; the lower cover plate and the upper cover plate are connected via the housing;

the connecting ring is welded with corrugated pipes to form the lower cavity and the upper cavity, and the lower cavity and the upper cavity are filled with a magnetorheological fluid; the connecting ring is equally divided in a circumferential direction into 2n areas each having a central angle of $\pi/n$, wherein n is a natural number, at least a part of the orifices are distributed in one area of each two adjacent areas of the 2n areas, and there are no orifices in the other area of the two adjacent areas; the magnetic conducting ring is installed at an outer side of the connecting ring, the permanent magnet and the paramagnet are installed at an inner side of the connecting ring in an alternative manner, and the permanent magnet and the paramagnet are installed on an output shaft of the ultrasonic motor via the upper gland and the lower gland;

one corrugated pipe, which defines the lower cavity, of the corrugated pipes, is located at an outer side of the ultrasonic motor, an end of the lower cavity and an end of the upper cavity are pressed by the lower cover plate and the upper cover plate respectively, to realize parallel connection of the corrugated pipes corresponding to the lower cavity and the upper cavity; and in a case that the input end and the output end for vibration isolation move relative to each other under an effect of a load, the connecting ring moves up and down relative to the housing, and the magnetorheological fluid in the lower cavity and the upper cavity is squeezed from one of the lower cavity and the upper cavity into the other through the orifices.

2. The magnetorheological vibration isolator regulated by the ultrasonic motor according to claim 1, wherein magnetic lines of force of the permanent magnet form a loop by passing through the connecting ring and the magnetic conducting ring, the ultrasonic motor is configured to drive the permanent magnet and the paramagnet to rotate;

in a case that the permanent magnet and the orifices overlap in the circumferential direction, a magnetic field between the permanent magnet and the magnetic conducting ring passes through the orifices, to make the magnetic field be strengthened at the orifices in an overlapping area, and a kinematic viscosity of the magnetorheological fluid in the orifices in the overlapping area is increased; and a magnitude of damping of the magnetorheological vibration isolator is adjusted by adjusting the number of the orifices in the magnetic field.

3. The magnetorheological vibration isolator regulated by the ultrasonic motor according to claim 1, wherein the ultrasonic motor operates in a continuous mode or a stepping mode, and an angular displacement sensor is used for feedback; in a case that the ultrasonic motor operates in the stepping mode, a zero position sensor is used to calibrate an angular position of a rotor of the ultrasonic motor, a rotation angle of the permanent magnet is calculated by counting the number of steps of the ultrasonic motor, and a degree of overlap between the permanent magnet and the orifices in the circumferential direction is obtained, to obtain a damping coefficient of the vibration isolator.

4. The magnetorheological vibration isolator regulated by the ultrasonic motor according to claim 3, wherein after driving the permanent magnet to a set angle, the ultrasonic motor is allowed to be powered off and self-locked, and the vibration isolator operates in a passive vibration isolation state.

5. The magnetorheological vibration isolator regulated by the ultrasonic motor according to claim 1, wherein the number of the magnetorheological dampers and an inclination angle of each of the magnetorheological dampers are determined based on characteristics of the vibration-to-be-isolated device and vibration isolation requirements.

6. The magnetorheological vibration isolator regulated by the ultrasonic motor according to claim 1, wherein each of the permanent magnet and the paramagnet is of a fan-shaped structure with a U-shaped cross section.

7. The magnetorheological vibration isolator regulated by the ultrasonic motor according to claim 6, wherein each of the permanent magnet and the paramagnet has a central angle of $\pi/n$ in each of the 2n areas.

8. The magnetorheological vibration isolator regulated by the ultrasonic motor according to claim 2, wherein the ultrasonic motor operates in a continuous mode or a stepping mode, and an angular displacement sensor is used for feedback; in a case that the ultrasonic motor operates in the stepping mode, a zero position sensor is used to calibrate an angular position of a rotor of the ultrasonic motor, a rotation angle of the permanent magnet is calculated by counting the number of steps of the ultrasonic motor, and a degree of overlap between the permanent magnet and the orifices in the circumferential direction is obtained, to obtain a damping coefficient of the vibration isolator.

* * * * *